US008200185B2

(12) United States Patent
Edge et al.

(10) Patent No.: US 8,200,185 B2
(45) Date of Patent: Jun. 12, 2012

(54) METHOD AND APPARATUS FOR SUPPORTING EMERGENCY CALLS (ECALLS)

(75) Inventors: Stephen W. Edge, Escondido, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 12/415,310

(22) Filed: Mar. 31, 2009

(65) Prior Publication Data

US 2009/0253403 A1 Oct. 8, 2009

Related U.S. Application Data

(60) Provisional application No. 61/041,873, filed on Apr. 2, 2008, provisional application No. 61/048,116, filed on Apr. 25, 2008, provisional application No. 61/061,586, filed on Jun. 13, 2008.

(51) Int. Cl.
*H04M 11/04* (2006.01)
*H04W 24/00* (2009.01)

(52) U.S. Cl. ............... 455/404.1; 455/456.1; 455/402.2

(58) Field of Classification Search .................. 455/456, 455/457, 456.1, 404.2, 439, 414.1, 67.1, 455/436, 435.1, 435.2; 370/356, 466, 329
See application file for complete search history.

(56) References Cited

U.S. PATENT DOCUMENTS 6,996,392 B2 * 2/2006 Anderson et al. .......... 455/404.2
7,068,993 B2 6/2006 Rai et al.
2002/0039904 A1 * 4/2002 Anderson ................... 455/456
2006/0030290 A1 2/2006 Rudolf et al.
2008/0009262 A1 1/2008 Rudolf et al.
2008/0020781 A1 * 1/2008 Cho ........................ 455/456.1

FOREIGN PATENT DOCUMENTS

EP 1189188 A1 3/2002
GB 2440576 A 2/2008

OTHER PUBLICATIONS

Watson, John, Vodafone Group R&D, "eCall Service Category Identifier," 4th PSAPs Expert Meeting on eCall (Brussels) Apr. 1, 2008.

(Continued)

*Primary Examiner* — Kiet Doan
(74) *Attorney, Agent, or Firm* — Jimmy Cheng; Arnold J. Gum

(57) ABSTRACT

Techniques for supporting eCalls are described. In an aspect, an eCall indicator may be used to indicate an eCall being established. In one design, a terminal may generate a message including an eCall indicator and may send the message to originate an eCall. The eCall indicator may indicate (i) whether or not a call is an eCall or (ii) whether an eCall is initiated automatically by the terminal or manually by a user. In another aspect, a terminal may avoid sending signaling for mobility management and connection management to wireless networks except for eCalls and designated calls. The terminal may avoid performing location updating, performing registration, responding to paging requests, etc. The terminal may exchange signaling with a wireless network for an eCall initiated by the terminal. After the eCall is initiated, the terminal may perform location updating with the wireless network and call establishment for the eCall.

9 Claims, 11 Drawing Sheets

OTHER PUBLICATIONS

Watson, John, Vodafone Group R&D—Standards, "Discussion paper: Analysis of the eCall SiMiess access and routing requirements, as proposed by ETSI MSG in their LS to 3GPP SA1, and possible solutions." Version 002, Feb. 20, 2007.
GSME, "Network operators meeting on eCall," Mar. 22, 2007.
3GPP TSG-SA WG1 Meeting#38, "Change Request. Requirements for transfer for data during emergency calls," 22.101 CR 0243, Rev 3, Current Version 8.6.0, Ljubljana, Solvenia, Oct. 29-Nov. 2, 2007.
3GPP TSG-SA WG1 Meeting#39, "Change Request, Requirements for the transfer of eCall Minimum Set of Data," 22.101 CR 0254, Rev 1, Current Version 8.7.0., Puerto Vallarta, Mexico, Jan. 28-Feb. 1, 2008.
3GPP TSG-CT WG1 Meetng#52, "Change Request, eCall identifier for Different Routing," 24.008 CR 1169, Rev—, Current Version 8.1.0., Jeju Island, Korea, Apr. 7-11, 2008.
3GPP TSG-CT WG1 Meeting#52, "Change Request, eCall Identifier for Different Routing," 24.008 CR 1169, Rev 1, Current Version 8.1.0., Jeju Island, Korea, Apr. 7-11, 2008.
3GPP TSG-CT WG1 Meeting#52, "Change Request, eCall Identifier for Different Routing," 24.008 CR 1169, Rev 2, Current Version 8.1.0., Jeju Island, Korea, Apr. 7-11, 2008.
3GPP TSG-CT WG1 Meeting#53, "Change Request, Avoidance of MM signaling for an eCall only Terminal," 24.008 CR 1189, Rev—, Current Version 8.1.0., Cape Town, South Africa, May 5-9, 2008.
3GPP TSG-CT WG1 Meeting#53, "Change Request, eCall Identifier for Differential Routing." 24.008 CR 1169, Rev 3, Current Version 8.1.0., Cape Town, South Africa, May 5-9, 2008.
3GPP TSG-CT WG1 Meeting#54, "Change Request, Avoidance of MM signaling for an eCall only Terminal," 24.008 CR 1189, Rev 1, Current Version 8.2.0., Zagreb, Coratia, May 23-27, 2008.
3GPP TSG-CT WG1 Meeting#54, "Change Request, Avoidance of MM signaling for an eCall only Terminal," 24.008 CR 1189. Rev 2, Current Version 8.2.0., Zagreb, Croatia, May 23-27, 2008.
3GPP TSG-CT WG1 Meeting#54, "Change Request, Avoidance of MM signaling for an eCall only Terminal," 24.008 CR 1189, Rev 3, Current Version 8.2.0., Zagreb, Croatia, May 23-27, 2008.
3GPP TSG-CT WG1 Meeting#54, "Change Request, Avoidance of MM signaling for an eCall only Terminal," 24.008 CR 1189, Rev 4, Current Version 8.2.0., Zagreb, Croatia, May 23-27, 2008.
International Search Report and Written Opinion—PCT/US2009/039176, International Search Authority—European Patent Office—Nov. 26, 2009 (081328).
Change Request 24.008 CR 1169 C1-080941—Mar. 31, 2008.
3rd Generation Partnership Project; Technical Specification Group Core Network; Mobile radio interface layer 3 specification; Core Network Protocols; Stage 3 (Release 1999), 3GPP TS 24.008 v3.19.0 (Jun. 2004).

* cited by examiner

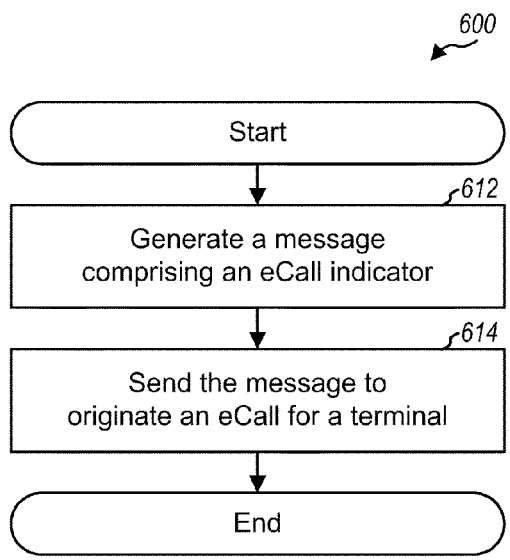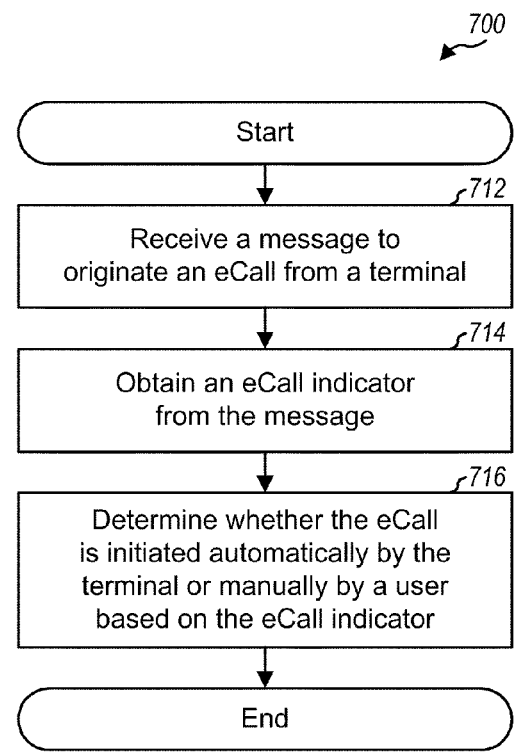
FIG. 6
FIG. 7

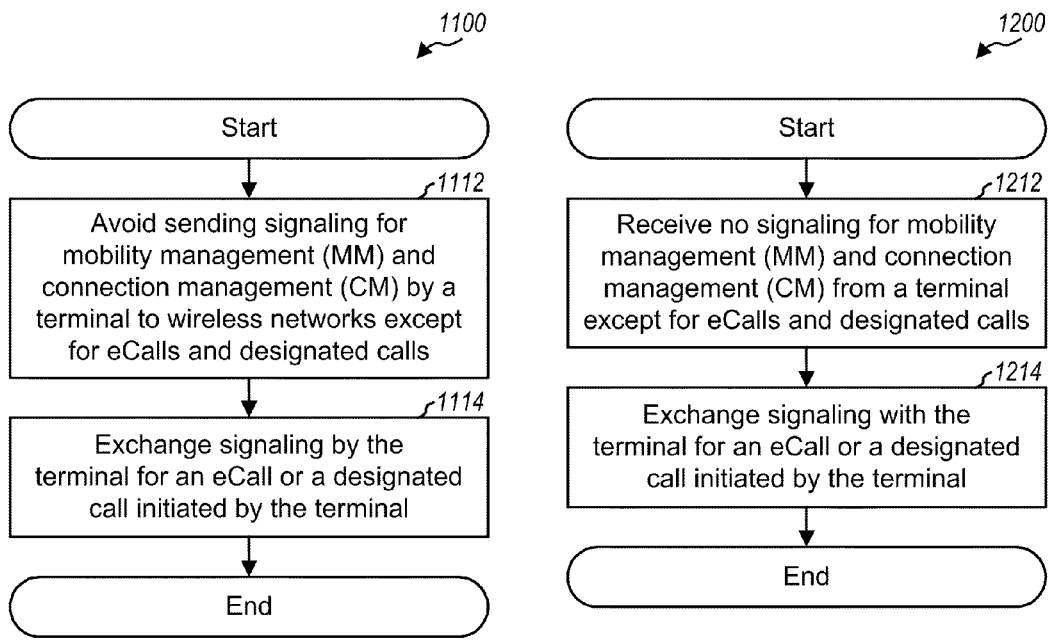

METHOD AND APPARATUS FOR SUPPORTING EMERGENCY CALLS (ECALLS)

I. CLAIM OF PRIORITY UNDER 35 U.S.C. §119

The present application for patent claims priority to Provisional U.S. Application Ser. No. 61/041,873, filed Apr. 2, 2008, Provisional U.S. Application Ser. No. 61/048,116, filed Apr. 25, 2008, and Provisional U.S. Application Ser. No. 61/061,586, filed Jun. 13, 2008, all entitled "Support of Minimal Network Signaling and Identification for an eCall Terminal," assigned to the assignee hereof, and expressly incorporated herein by reference.

BACKGROUND

I. Field

The present disclosure relates generally to communication, and more specifically to techniques for supporting emergency calls.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may support communication for a number of terminals. A terminal may place an emergency call in response to an emergency event. An emergency call is a call for emergency services (e.g., police, fire, medical, or other emergency services) and may also be referred to as an emergency services call. An emergency call may be initiated by a user dialing a well-known emergency number such as '911' in North America or '112' in Europe. It may be desirable to efficiently exchange signaling between the terminal and the wireless network for the emergency call in order to reduce signaling overhead.

SUMMARY

Techniques for supporting eCalls are described herein. An eCall is an emergency call that may (i) be initiated automatically by a wireless terminal due to a trigger event (e.g., a vehicle involved in an accident) or manually by a user and (ii) include additional data sent automatically by the terminal to a recipient entity, e.g., a Public Safety Answering Point (PSAP). The additional data may include vehicle identification, vehicle location, trigger event, etc., and may be sent inband along a voice path or out-of-band via separate signaling or data/text transfer. A terminal that supports eCall may be (i) a normal wireless terminal that subscribes to normal services such as voice calls, packet data, text messages, video, etc. or (ii) a terminal that supports only eCalls, which is referred to as an eCall-only terminal. An eCall comprises an emergency call (similar to an emergency call initiated by a user dialing '911') plus automatic sending of additional data to the recipient entity.

In an aspect, an eCall indicator may be used to indicate an eCall being established. In one design, a terminal may generate a message comprising an eCall indicator and may send the message to originate an eCall. In one design, the eCall indicator may indicate whether or not a call is an eCall. In another design, the eCall indicator may indicate whether a call is (i) an eCall initiated automatically by the terminal or (ii) an eCall initiated manually by a user. The eCall indicator may also convey other information.

The eCall indicator may be implemented in various manners. In a first design, the message may comprise a Service Category information element having at least one bit used for the eCall indicator. In a second design, the message may comprise a new information element comprising the eCall indicator. In a third design, the message may comprise a Connection Management (CM) Service Type information element having at least one value used for the eCall indicator. In a fourth design, the message may comprise a Mobile Station (MS) Classmark 2 information element having at least one flag used for the eCall indicator. In a fifth design, the message may comprise a called party number reserved and used for the eCall indicator. The eCall indicator may also be conveyed in other manners.

In another aspect, an eCall-only terminal may avoid sending signaling for mobility management (MM) and connection management (CM) to wireless networks except for eCalls and designated calls. The designated calls may comprise calls for testing eCall functionality, calls for reconfiguring the terminal, and/or other specifically defined calls. For example, a designated call may be allowed to a specific number assigned by a home wireless operator associated with customer service that can be used to request terminal reconfiguration (e.g., convert an eCall-only terminal into a terminal able to provide normal services as well as eCall) as well verify that the terminal is working correctly. The eCall-only terminal may periodically search for wireless networks after being powered on but may avoid sending signaling to detected networks. The terminal may avoid performing location updating, performing registration, responding to paging requests, etc. The terminal may exchange signaling with a wireless network for an eCall or a designated call initiated by the terminal. In one design, after the eCall or designated call is initiated, the terminal may perform location updating with the wireless network and call establishment for the eCall or designated call.

Various aspects and features of the disclosure are described in further detail below.

BRIEF DESCRIPTION OF THE DRAWINGS

FIG. 6 shows a process performed by a terminal for eCall establishment.

FIG. 7 shows a process performed by a network to support eCall establishment.

FIG. 11 shows a process performed by a terminal.

FIG. 12 shows a process performed by a wireless network.

DETAILED DESCRIPTION

Figure 1:
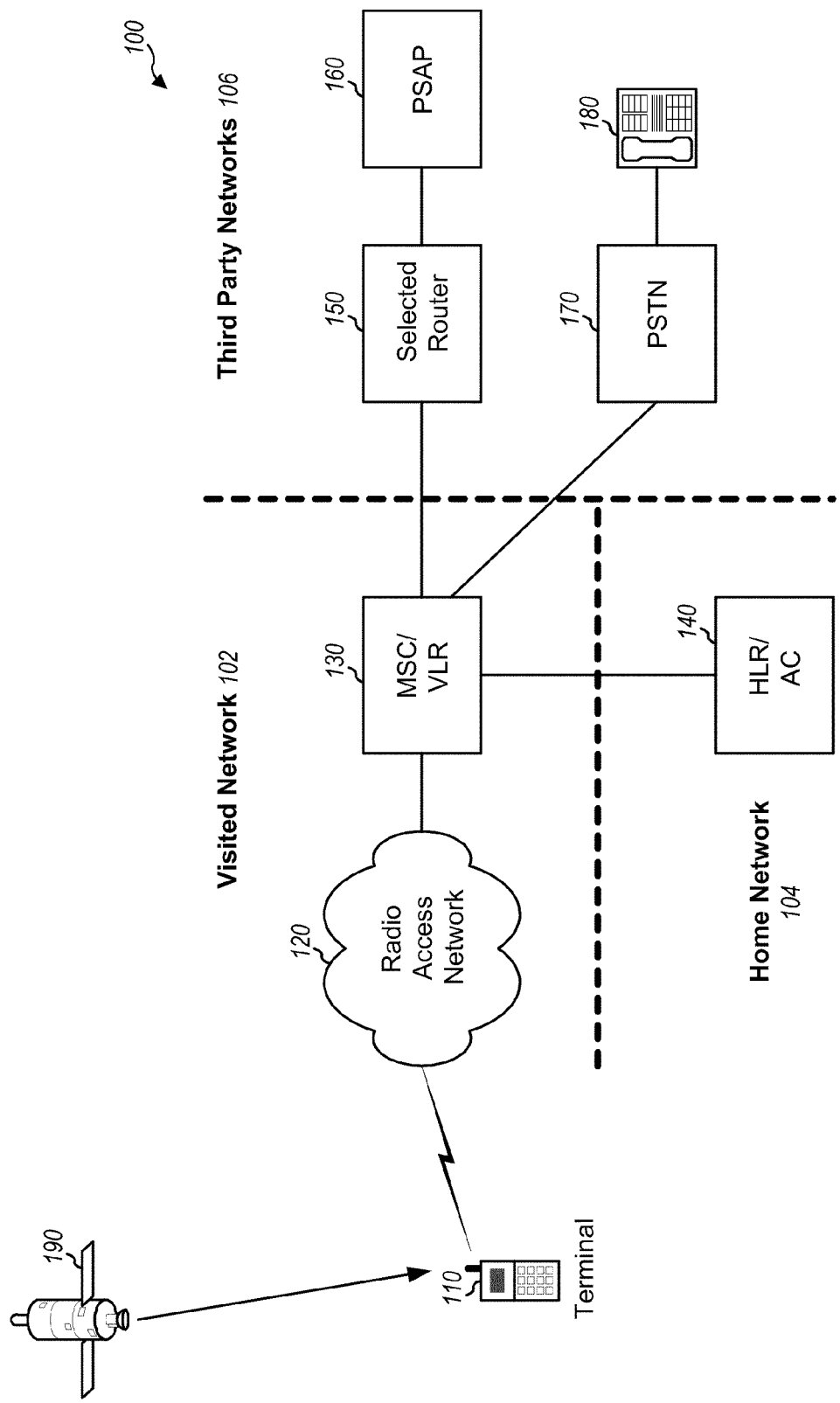
FIG. 1 shows an exemplary network deployment.

FIG. 1 shows an exemplary network deployment 100, which may include a visited network 102, a home network 104, and third party networks 106. Visited network 102 may also be referred to as a Visited Public Land Mobile Network (V-PLMN), a serving network, etc. Home network 104 may also be referred to as a Home PLMN (H-PLMN). Visited network 102 may be a serving network for a terminal 110, which may be roaming from its home network 104, as assumed in much of the description below. Visited network 102 and home network 104 may be the same network if terminal 110 is not roaming.

Visited network 102 may include a radio access network (RAN) 120, a Mobile Switching Center (MSC)/Visitor Location Register (VLR) 130, and other network entities not shown in FIG. 1 for simplicity. RAN 120 may be a Global System for Mobile Communications (GSM) network, a Wideband Code Division Multiple Access (WCDMA) network, a General Packet Radio Service (GPRS) access network, a Long Term Evolution (LTE) network, CDMA 1X network, a High Rate Packet Data (HRPD) network, an Ultra Mobile Broadband (UMB) network, etc. GSM, WCDMA, GPRS and LTE are part of Universal Mobile Telecommunication System (UMTS) and are described in documents from an organization named "3rd Generation Partnership Project" (3GPP). CDMA 1X and HRPD are part of cdma2000, and cdma2000 and UMB are described in documents from an organization named "3rd Generation Partnership Project 2" (3GPP2). MSC 130 may perform switching functions for circuit-switched calls and may also route Short Message Service (SMS) messages. VLR 130 may store registration information for terminals that have registered with visited network 102.

Home network 104 may include a Home Location Register (HLR)/Authentication Center (AC) 140 and other network entities not shown in FIG. 1 for simplicity. HLR 140 may store subscription information for terminals that have service subscription with home network 104. AC 140 may perform authentication for terminals having service subscription with home network 104.

Third party networks 106 may include a router 150 (e.g., a PSAP selected router), a PSAP 160, a Public Switched Telephone Network (PSTN) 170, and possibly other network entities not shown in FIG. 1. Router 150 may route calls between MSC 130 and PSAP 160. PSAP 160 may be responsible for answering emergency calls and may also be referred to as an Emergency Center (EC). PSAP 160 may be operated or owned by a government agency, e.g., a county or city. PSTN 170 may provide telephone services for conventional wireline telephones, such as a telephone 180.

FIG. 1 shows only some of the network entities that may be present in visited network 102 and home network 104. For example, visited network 102 may include network entities supporting packet-switched calls and other services as well a location server to assist in obtaining terminal location.

Terminal 110 may be stationary or mobile and may also be referred to as a mobile station (MS) in GSM and CDMA 1X, a user equipment (UE) in WCDMA and LTE, an access terminal (AT) in HRPD, a SUPL enabled terminal (SET) in Secure User Plane Location (SUPL), a subscriber unit, a station, etc. Terminal 110 may be a device such as a cellular phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. Terminal 110 may also be devices which communicate with a personal navigation device (PND), such as by short-range wireless, infrared, wireline connection, or other connection—regardless of whether satellite signal reception, assistance data reception, and/or position-related processing occurs at the device or at the PND. Also, terminal 110 is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also included. Terminal 110 may also be a dedicated In-Vehicle System (IVS), which may be permanently attached to (and possibly part of) a vehicle.

Terminal 110 may have a service subscription with home network 104 and may be roaming in visited network 102, as shown in FIG. 1. Terminal 110 may receive signals from RAN 120 in visited network 102 or may communicate with the RAN to obtain communication services. Terminal 110 may also communicate with home network 104 for communication services when not roaming (not shown in FIG. 1). Terminal 110 may also receive signals from one or more satellites 190, which may be part of a satellite positioning system (SPS). An SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Terminal 110 may measure signals from satellites 190 and obtain pseudo-range measurements for the satellites. Terminal 110 may also measure signals from base stations in RAN 120 and obtain timing and/or signal strength measurements for the base stations. The pseudo-range measurements, timing measurements and/or signal strength measurements may be used to derive a position estimate for terminal 110. A position estimate may also be referred to as a location estimate, a position fix, etc.

Terminal 110 may have an International Mobile Equipment Identity (IMEI), which is a unique number assigned to the terminal. Terminal 110 may be used for a service subscription of a user. The service subscription may be associated with an International Mobile Subscriber Identity (IMSI), which is a unique number assigned to a subscription for GSM and UMTS networks. The service subscription may also be associated with a Mobile Subscriber Integrated Services Digital Network Number (MSISDN), which is a telephone number for the service subscription. The IMSI may be used as a key for the service subscription in a subscriber database in HLR 140. The MSISDN may be dialed by other users to connect calls to terminal 110 used for the service subscription. The IMSI, the MSISDN, and other subscription information may be stored in a Subscriber Identity Module (SIM) or a Universal Subscriber Identity Module (USIM), which may be inserted into terminal 110. Terminal 110 may also have no SIM/USIM, in which case terminal 110 may have only an IMEI but no IMSI or MSISDN.

Wireless networks may be required to support different types of emergency calls. One type may include "normal" emergency calls originated by users dialing well-known emergency numbers such as '911' in North America and '112' in Europe. Another type may include eCalls, which are emergency calls that may have the characteristics described above. Support for eCalls may be required by the European Union and by other world regions and/or countries. An eCall may be different from a normal emergency call in the manners in which the call is placed and the additional emergency related data that may be sent to establish the eCall and used to process the eCall. For example, the additional data may indicate how the eCall was initiated, a vehicle type and vehicle identification number (VIN), a timestamp, a position estimate and position confidence flag, the direction of travel, the number of passengers (e.g., with fastened seatbelts), a service provider for the terminal (if any), a trigger type (e.g., deployed airbags, bumper sensors, etc.), and possibly other information. The additional data may enable an accurate geographic location of the terminal to be provided to a PSAP.

Figure 2:
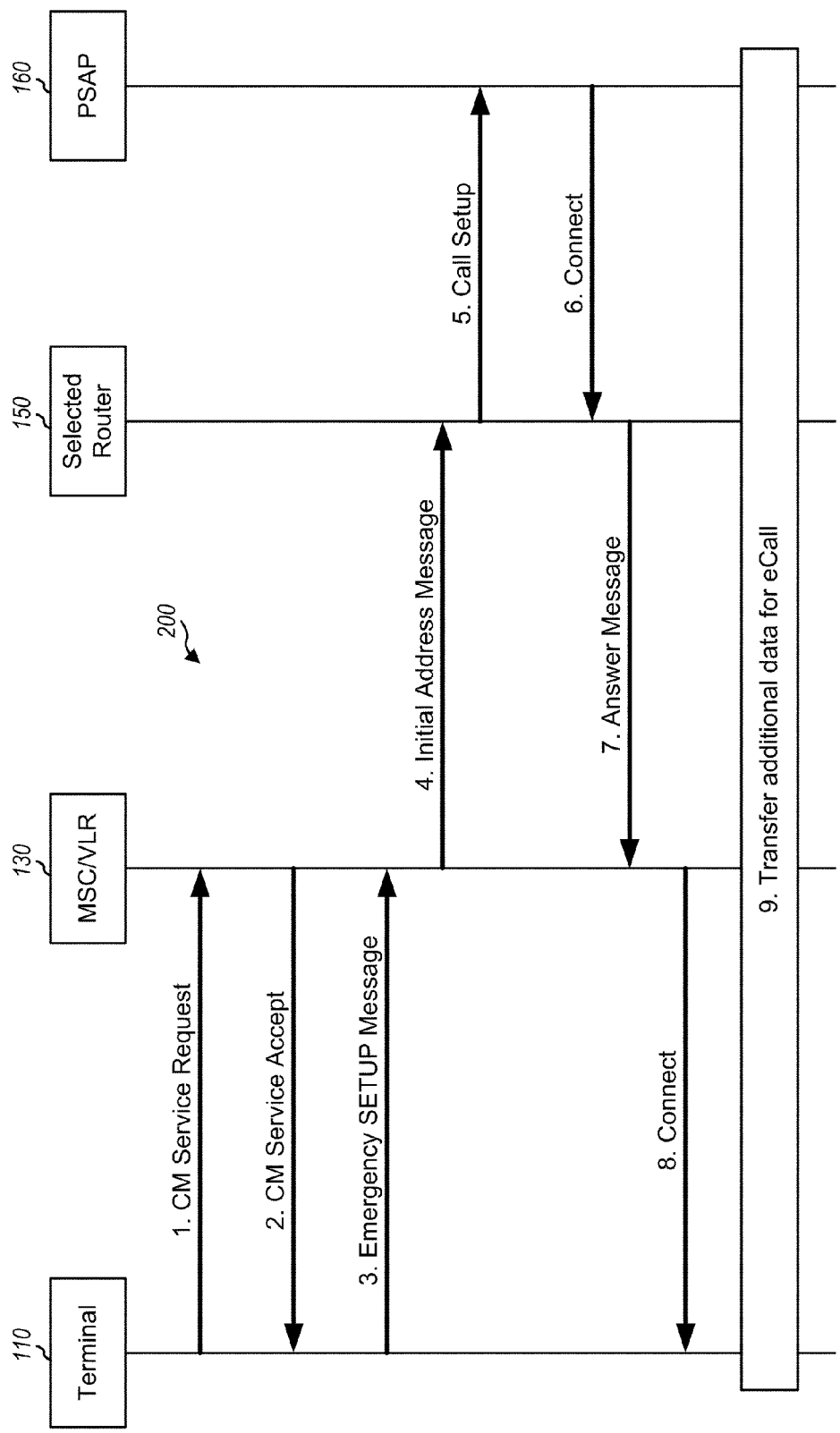
FIG. 2 shows a message flow for establishing an eCall by a terminal.

FIG. 2 shows a design of a message flow 200 for establishing an eCall by terminal 110 in FIG. 1. For simplicity, some network entities (e.g., RAN 120) and some less pertinent signaling messages are not shown in FIG. 2. Terminal 110 may initially acquire radio access to a serving base station and may send a CM Service Request message to MSC/VLR 130 to request for service (step 1). MSC/VLR 130 may receive the message and may respond with a CM Service Accept message (step 2). Terminal 110 may then send an Emergency SETUP message to originate an eCall (step 3). MSC/VLR 130 may receive the message and may send an Initial Address Message to router 150 to originate a call for terminal 110 (step 4). Router 150 may then send a Call Setup message to PSAP 160 to establish the call for terminal 110 (step 5). PSAP 160 may return a Connect message to router 150 (step 6), which may then return an Answer Message to MSC/VLR 130 (step 7). MSC/VLR 130 may then return a Connect message to terminal 110 (step 8). Terminal 160 may transfer additional data for the eCall to the network for possible forwarding to PSAP 160 (step 9). The transfer of additional data may also be performed in steps 3, 4 and 5 or some other steps prior to step 9. In any case, the eCall may be established for terminal 110 after steps 8 and 9. Terminal 110 may then communicate with PSAP 160 for the eCall.

An eCall may be initiated automatically by terminal 110 (e.g., due to a vehicle collision) or manually by a user (e.g., a vehicle occupant). Terminal 110 may be any device supporting eCall functionality such as a cellular phone, an IVS, etc. In one design, terminal 110 may provide an eCall indicator in the emergency call setup. The eCall indicator may convey one of the following:

Manually Initiated eCall (MIeC) originated by the user, or
Automatically Initiated eCall (AIeC) originated by the terminal.

The eCall indicator may be used by a wireless network to differentiate the eCall from normal emergency calls, to filter or route the eCall to an appropriate PSAP (e.g., a PSAP equipped to receive eCalls), and/or for other purposes. The eCall indicator may be conveyed by terminal 110 in various manners during emergency call setup. The eCall indicator may be sent in a CM Service Request message, an Emergency SETUP message, a SETUP message, or some other message sent by terminal 110.

Figure 3:
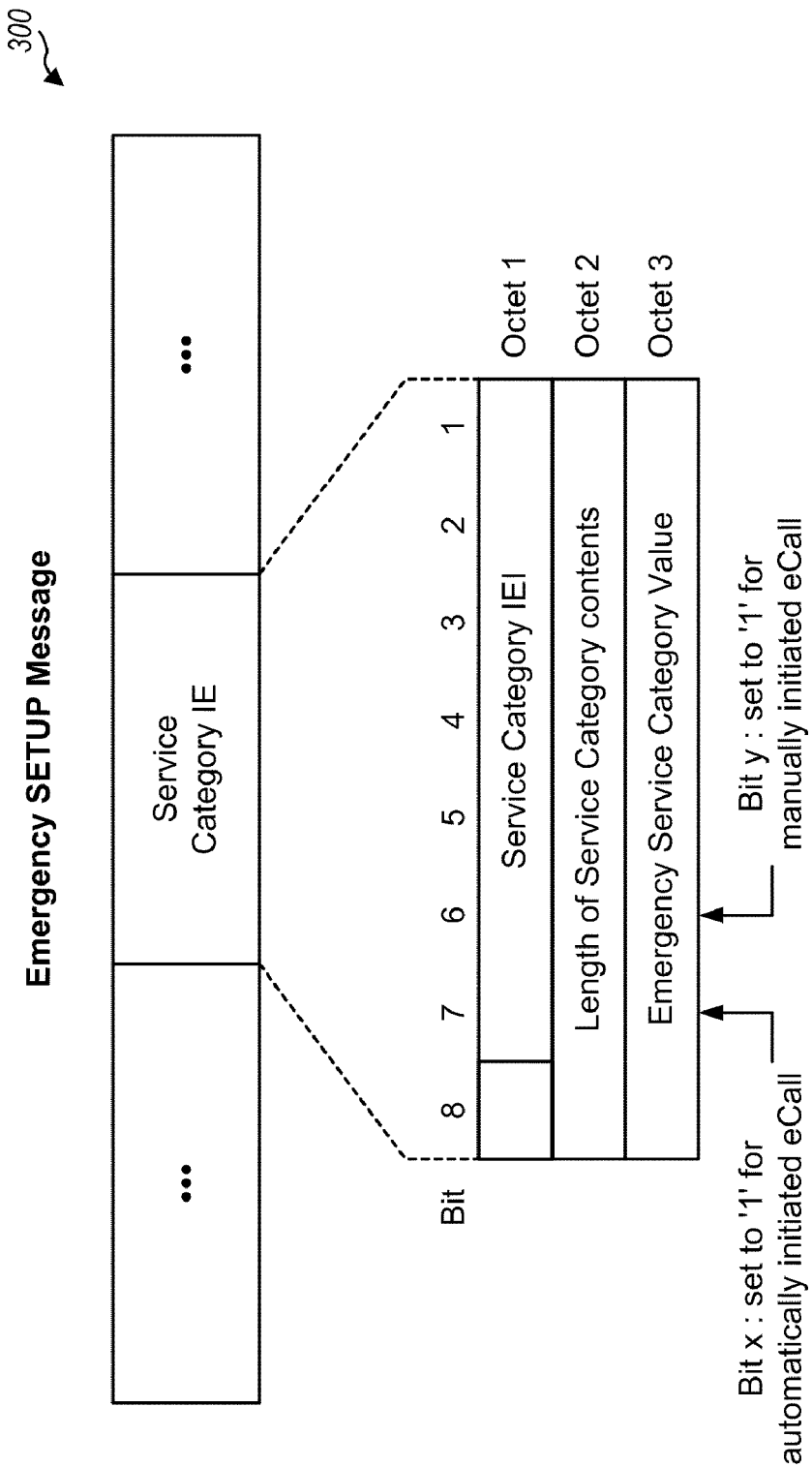
FIG. 3 shows an Emergency SETUP message carrying an eCall indicator.

FIG. 3 shows a design of an Emergency SETUP message 300 that may carry an eCall indicator. The Emergency SETUP message may include various information elements (IEs), one of which may be a Service Category IE used to provide a wireless network with information about services being invoked by a terminal. For an eCall, the Service Category IE may include (i) a Service Category IE identifier (IEI) that may be set to a specific value assigned to the Service Category IE, (ii) a Length of Service Category field that may indicate the length of the Service Category IE, and (iii) an Emergency Service Category Value field that may provide information for an eCall.

In the design shown in FIG. 3, an eCall indicator may be implemented with two bits in the Emergency Service Category Value field. One bit (labeled as bit x) may be set to '1' to convey an automatically initiated eCall or to '0' otherwise. The other bit (labeled as bit y) may be set to '1' to convey a manually initiated eCall or to '0' otherwise. In another design, an eCall indicator may be implemented with a single bit that may be set to '1' to indicate an eCall or to '0' otherwise. The eCall indicator may also be implemented in other manners in the Service Category IE.

In another design, a new IE may be defined to carry the eCall indicator. This new IE may be assigned a separate IEI and may convey the eCall indicator with one or two bits, which may be set as described above for the Service Category IE.

Figure 4:
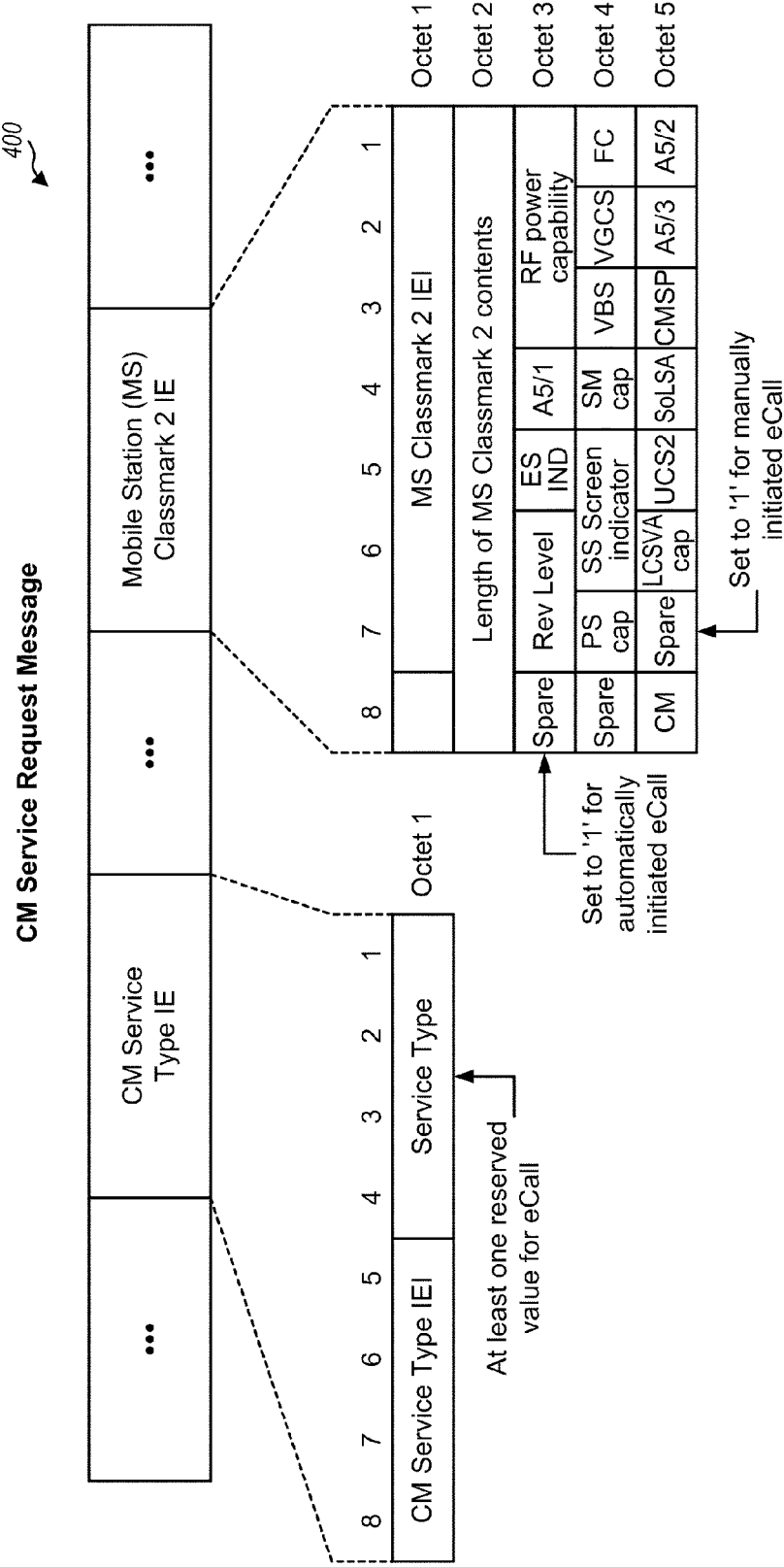
FIG. 4 shows a CM Service Request message carrying an eCall indicator.

FIG. 4 shows a design of a CM Service Request message 400 that may carry an eCall indicator. The CM Service Request message may include various IEs such as a CM Service Type IE used to specify which service is being requested from a wireless network. The CM Service Type IE may include (i) an IEI that may be set to a specific value assigned to the CM Service Type IE and (ii) a Service Type field that may indicate the requested service.

In one design, for an eCall, one or more values of the Service Type field may be reserved and used to convey the eCall indicator. In one design, a single value may be reserved for the eCall indicator. The Service Type field may then be set to this reserved value to request emergency services for an eCall. In another design, two values may be reserved for the eCall indicator. The Service Type field may then be set to (i) a first reserved value to request emergency services for a manually initiated eCall or (ii) a second reserved value to request emergency services for an automatically initiated eCall.

The CM Service Request message may also include an MS Classmark 2 IE used to provide information regarding a terminal to a wireless network. Octet 1 of this IE may include an IEI for the MS Classmark 2 IE. Octet 2 may include the length of the MS Classmark 2 IE. Octets 3, 4 and 5 may include various fields/flags described in 3GPP TS 24.008, entitled "Mobile radio interface Layer 3 specification; Core network protocols; Stage 3," which is publicly available. As shown in FIG. 4, three spare bits/flags may be present in the MS Classmark 2 IE and may be set to '0' normally. In one design, one spare bit (e.g., bit 8 of octet 3) may be used for the eCall indicator and may be set to '1' to indicate an eCall-only terminal or to '0' otherwise. In another design, two spare bits may be used for the eCall indicator. One spare bit (e.g., bit 8 of octet 3) may be set to '1' to indicate an automatically initiated eCall-only terminal or to '0' otherwise. Another spare bit (e.g., bit 7 of octet 5) may be set to '1' to indicate a manually initiated eCall-only terminal or to '0' otherwise.

Figure 5:
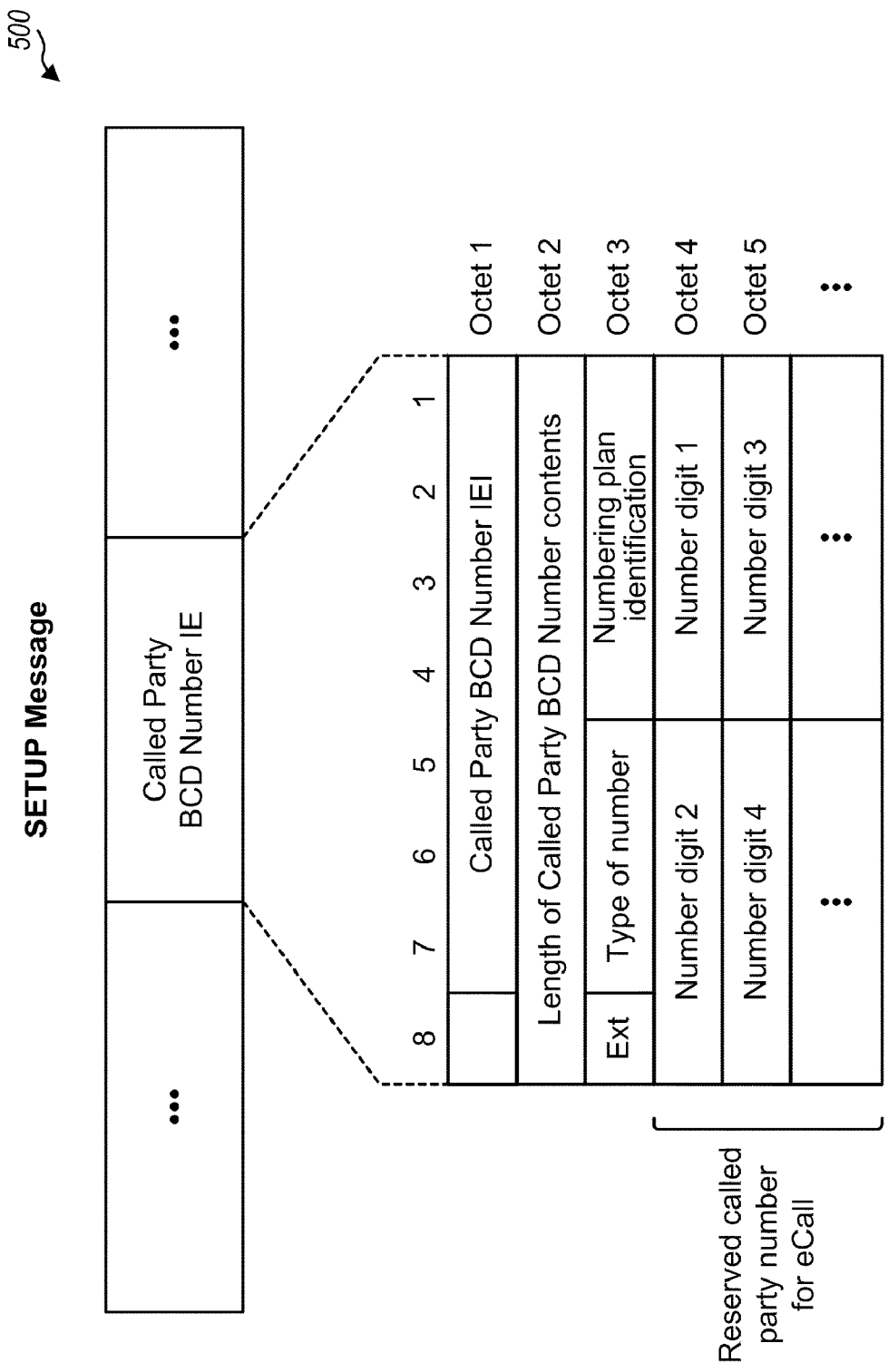
FIG. 5 shows a SETUP message carrying an eCall indicator.

FIG. 5 shows a design of a SETUP message 500 that may carry an eCall indicator. The SETUP message may include various IEs such as a Called Party BCD Number IE used to identify a called party. Octet 1 of this IE may include an IEI for the Called Party BCD Number IE. Octet 2 may include the length of the Called Party BCD Number IE. Octet 3 may include the called party number type and the numbering plan applicable for the called party number. Each subsequent octet may include up to two digits of the called party number.

In one design, a reserved called party number may be used for the eCall indicator and may be sent in the SETUP message to indicate an eCall. In another design, two reserved called party numbers may be used for the eCall indicator. A first reserved called party number may be sent in the SETUP message to indicate a manually initiated eCall. A second reserved called party number may be sent in the SETUP message to indicate an automatically initiated eCall.

In one design, the reserved called party number(s) may be full telephone numbers that may be reserved for eCalls by all or many network operators. In another design, the reserved called party number(s) may be extended versions of a conventional emergency number. For example, "911-1" and "911-2" may be used as reserved called party numbers for manually and automatically initiated eCalls, respectively, in North America. Correspondingly, "112-1" and "112-2" may be used as reserved called party numbers for manually and automatically initiated eCalls, respectively, in Europe. Other telephone number(s) may also be reserved and used for the eCall indicator.

In yet another design, subscription information from an HLR may be used to indicate an eCall-only terminal. In FIG. 1, terminal 110 may originate an eCall with visited network 102 and may perform registration prior to call setup. For registration, VLR 130 in visited network 102 may communicate with HLR 140 in home network 104 to obtain subscription information for terminal 110. HLR 140 may provide information indicating that terminal 110 is an eCall-only terminal. Visited network 102 may then serve terminal 110 for the eCall.

Various designs of an eCall indicator have been described above and may be used to explicitly indicate that an eCall is being placed by a terminal. Some or all of these designs may also be able to distinguish between a manually initiated eCall triggered by a user and an automatically initiated eCall triggered by the terminal, e.g., due to a vehicle accident. The eCall indicator may also be conveyed in other messages and/or using other fields, bits, and values beside the ones described above.

FIG. 6 shows a design of a process 600 performed by a terminal for eCall establishment. The terminal may generate a message comprising an eCall indicator (block 612). The message may comprise a CM Service Request message, an Emergency SETUP message, a SETUP message, or some other message. The terminal may send the message to originate an eCall (block 614).

In a first design, the message may comprise a Service Category information element having at least one bit used for the eCall indicator, e.g., as shown in FIG. 3. In one design, the at least one bit used for the eCall indicator may comprise (i) a first bit indicating whether the eCall is initiated automatically by the terminal and (ii) a second bit indicating whether the eCall is initiated manually by a user. In another design, the at least one bit used for the eCall indicator may comprise a single bit indicating whether or not an eCall is being initiated.

In a second design, the message may include a new information element comprising the eCall indicator. In a third design, the message may comprise a CM Service Type information element having at least one value used for the eCall indicator, e.g., as shown in FIG. 4. In a fourth design, the message may comprise an MS Classmark 2 information element having at least one flag used for the eCall indicator, e.g., as shown in FIG. 4. In a fifth design, the message may comprise a called party number reserved for the eCall indicator, e.g., as shown in FIG. 5. The eCall indicator may also be conveyed in other manners, e.g., with other messages, other information elements, other bits or values, etc.

FIG. 7 shows a design of a process 700 performed by a wireless network to support eCall establishment. The network may receive a message to originate an eCall from a terminal (block 712). The network may obtain an eCall indicator from the message (block 714). The network may determine whether the eCall is initiated automatically by the terminal or manually by a user based on the eCall indicator (block 716). In one design, the message may comprise a Service Category information element having first and second bits used for the eCall indicator. The first bit may indicate whether the eCall is initiated automatically by the terminal, and the second bit may indicate whether the eCall is initiated manually by a user. The eCall indicator may also be conveyed in other manners.

A large number of eCall-only terminals may be deployed, e.g., in vehicles and at other locations. These eCall-only terminals may be powered on for long periods of time but may rarely originate eCalls. It may be desirable to reduce the amount of signaling exchanged by eCall-only terminals in order to reduce signaling overhead for wireless networks.

Figure 8:
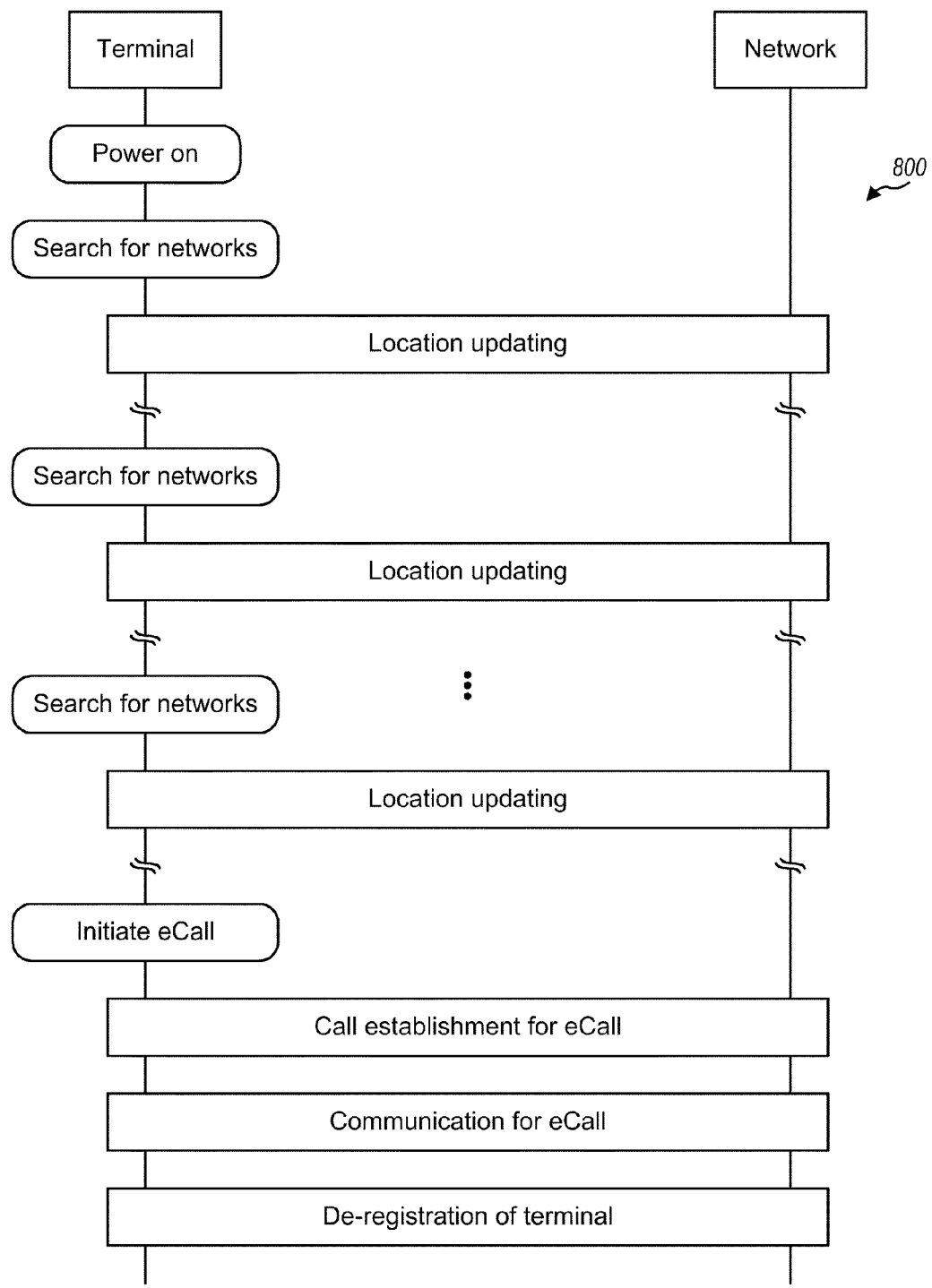
FIG. 8 shows operation of a terminal with normal signaling.

FIG. 8 shows operation 800 of terminal 110 with normal signaling. Upon being powered on, terminal 110 may search for wireless networks from which it can obtain service. Terminal 110 may then perform registration and location updating with a detected network. The registration may allow the network to learn of the terminal's presence. The location updating may allow the network to obtain the terminal's location, so that the terminal can be paged for incoming calls. Terminal 110 may thereafter periodically search for better cells and/or networks. Upon detecting a better cell or network, terminal 110 may perform location updating and possibly registration, if necessary. Terminal 110 may perform call establishment at any time in order to originate an eCall. Terminal 110 may then communicate with a PSAP for the eCall. Terminal 110 may perform de-registration after termination of the eCall.

Terminal 110 may perform location updating any number of times and at any rate, depending on its mobility and the network coverage. Terminal 110 may exchange signaling with a wireless network for each instance of location updating. Terminal 110 may make an eCall very infrequently, and the information exchanged in most instances of location updating may not be used. It may thus be highly inefficient for an eCall-only terminal to perform location updating many times prior to call establishment.

Figure 9:
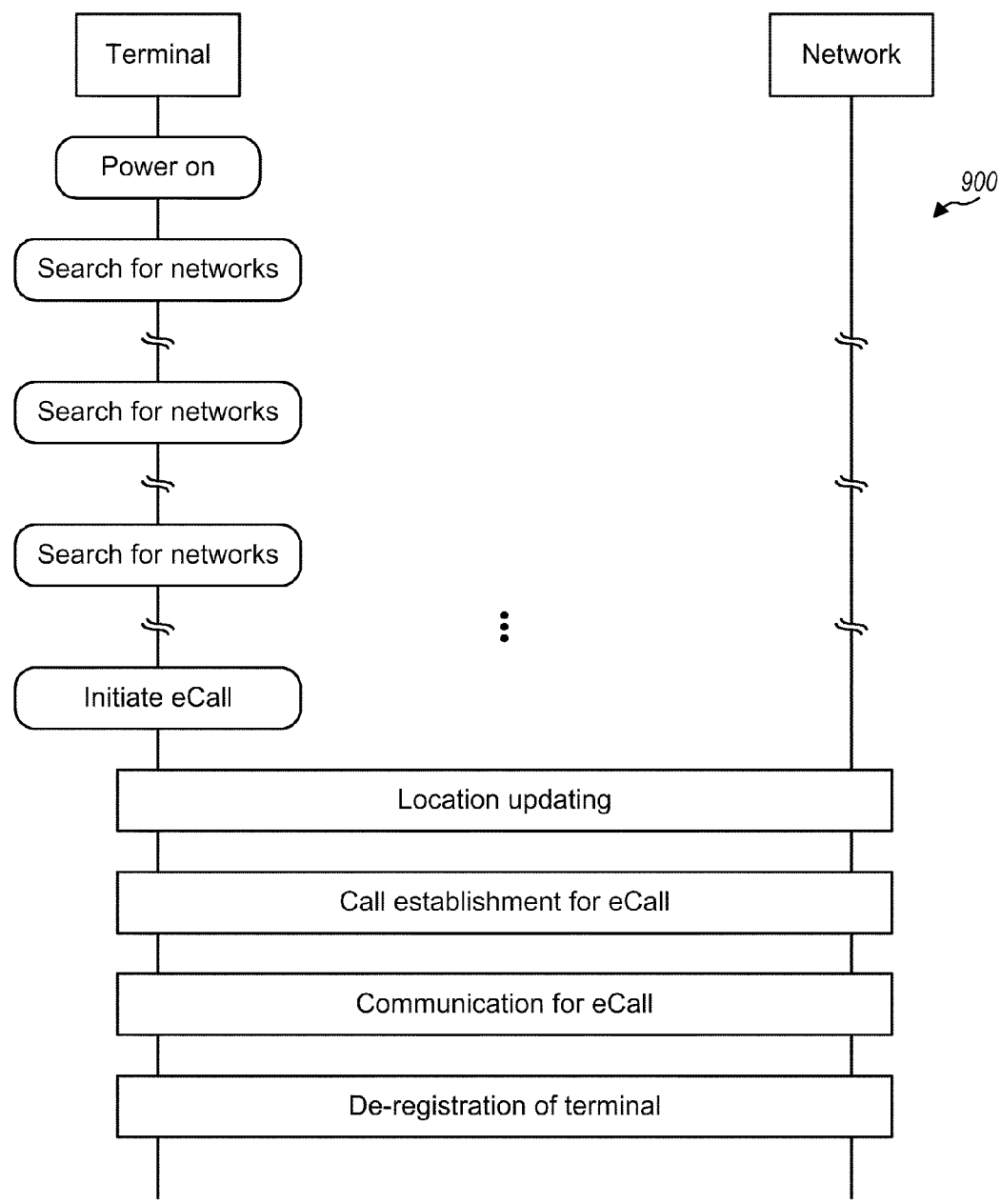
FIG. 9 shows operation of an eCall-only terminal with reduced signaling.

FIG. 9 shows operation 900 of terminal 110, which may be an eCall-only terminal, with reduced signaling. Upon being powered on, terminal 110 may search for wireless networks from which it can obtain service. Terminal 110 may obtain network availability information, timing information, and/or other system information from a detected network and may store the information for possible use to establish an eCall, if necessary. Terminal 110 may avoid sending signaling for mobility management (MM) and connection management (CM) and may maintain radio silence with the detected network. Wireless networks may not be aware of the presence of terminal 110. Terminal 110 may periodically search for better cells and/or networks and may update its information for a potential serving network and a potential serving cell.

Terminal 110 may receive an indication to originate an eCall, e.g., from the user or a trigger event. In response, terminal 110 may perform registration and location updating with the most recently detected network. Terminal 110 may then perform call establishment for the eCall, e.g., as shown in FIG. 2. In general, terminal 110 may perform registration prior to or after call establishment for the eCall. Terminal 110 may also perform location updating at the start of the eCall or during the eCall. Terminal 110 may perform location updating if callback (e.g., from a selected PSAP) is supported and may skip location updating otherwise.

Terminal 110 may communicate with a PSAP for the eCall. The eCall may be released at some point in time. In one design, terminal 110 may continue to support MM and CM procedures for a limited time period. This may be desirable to support callback from the PSAP and to allow terminal 110 to quickly place a follow-on call, if necessary. If the service subscription for terminal 110 (which may be stored in HLR 140) does not bar incoming calls, then the PSAP may be able to call back terminal 110 during the limited time period. At the end of the limited time period, terminal 110 may perform an IMSI detach if required by the serving network. The serving network may also de-register terminal 110 after a predetermined amount of time has elapsed since the end of the eCall. The de-registration may be performed automatically without having to exchange signaling with terminal 110.

As shown in FIGS. 8 and 9, signaling overhead may be substantially reduced by having terminal 110 avoid performing location updating while powered on and perform location updating only when an eCall is initiated.

It may be desirable to perform location updating prior to call establishment for an eCall, e.g., as shown in FIG. 9. The location updating may enable authentication of terminal 110 and downloading of subscription information for terminal 110 from HLR 140 in home network 104 to VLR 130 in visited network 102. The subscription information may include the MSISDN for terminal 110. MSC 130 may forward an authenticated eCall with the MSISDN to PSAP 160. PSAP 160 may use the MSISDN for callback to terminal 110, if necessary.

In one design, location updating for the eCall may be given higher priority than normal location updating in order to expedite call setup for the eCall. Terminal 110 may send a Location Updating Request message when triggered by a CM request for the eCall. The Location Updating Request message may indicate a pending eCall or emergency call to inform visited network 102 (e.g., MSC/VLR 130) of the pending call and to enable visited network 102 to prioritize the location updating. In one design, the Location Updating Request message may include a Location Updating Type IE having a designated bit that may be set to '1' to indicate a pending eCall or emergency call or to '0' otherwise. Visited network 102 may prioritize treatment if a pending eCall or emergency call is indicated in the Location Updating Request message.

Terminal 110 may not have performed location updating and may not have an MM connection prior to establishing an eCall, e.g., as shown in FIG. 9. Call setup delay for the eCall may be reduced in several manners. In one design, terminal 110 may be identified by its IMEI, since the IMSI for the service subscription may be unknown to VLR 130. An unauthenticated eCall with no callback identification (e.g., no MSISDN) may then be delivered to PSAP 160. This design may be used in countries and networks supporting unauthenticated eCalls. In another design, terminal 110 may send a CM Service Request message for the eCall and may identify itself with its IMSI. This may allow MSC/VLR 130 in visited network 102 to request authentication information from HLR/AC 140 in home network 104. MSC/VLR 130 may authenticate terminal 110 and then deliver an authenticated eCall to PSAP 160. In yet another design, terminal 110 may include a SIM/USIM, may be authenticated, and may possess an MSISDN. The MSISDN may be transferred to a PSAP for purposes of identification and call back.

Figure 10:
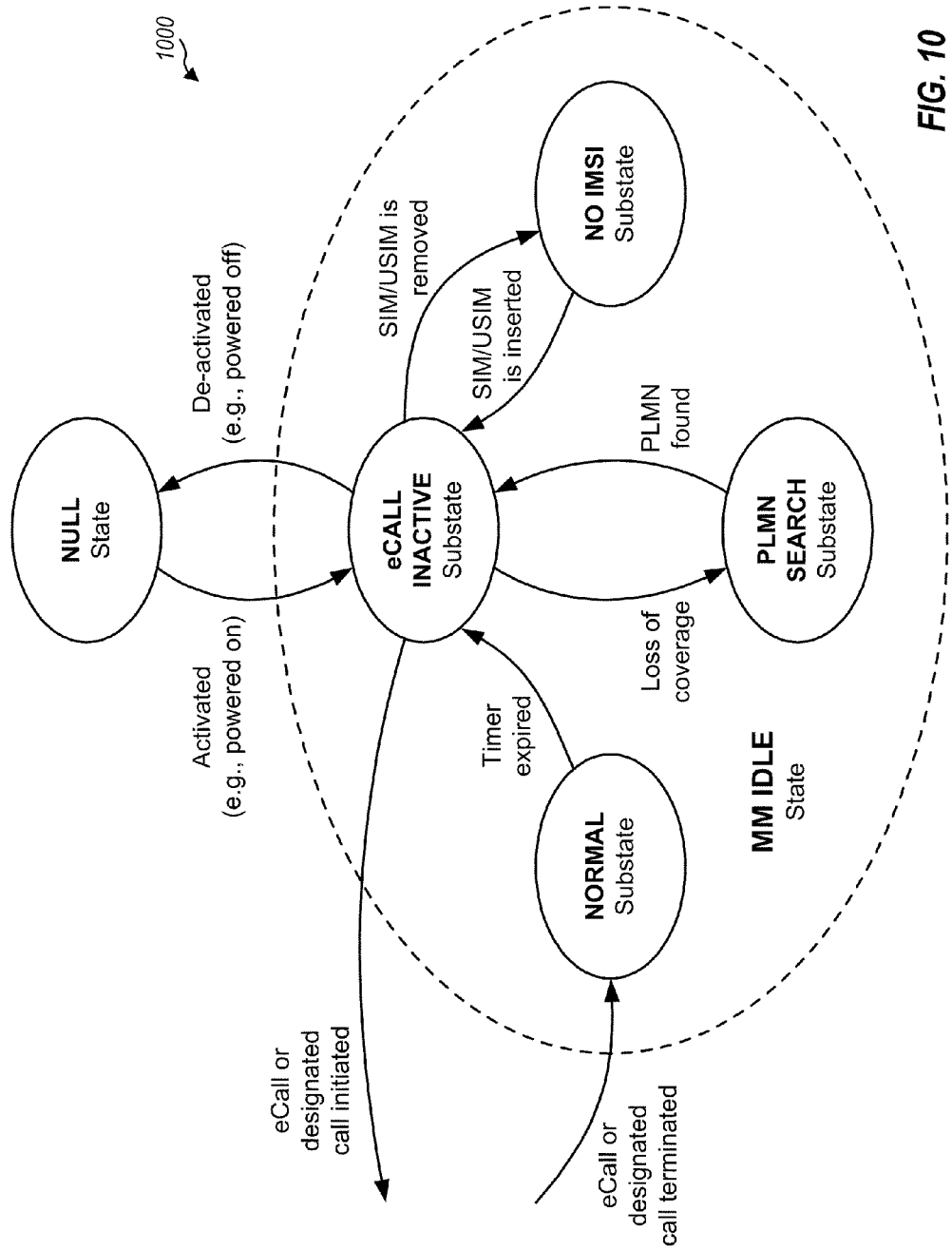
FIG. 10 shows a state diagram for an eCall-only terminal.

FIG. 10 shows a design of a state diagram 1000 for mobility management (MM) for an eCall-only terminal, e.g., terminal 110. For simplicity, not all states and substates available for mobility management are shown in FIG. 10.

Upon being powered on, terminal 110 may operate in an eCALL INACTIVE substate of an MM IDLE state. The eCALL INACTIVE substate may be applicable to an eCall-only terminal where a home network operator requires normal support for an eCall, e.g., for location updating, authentication, terminal identification to a PSAP, and possibly callback capability from the PSAP. Terminal 110 may enter the eCALL INACTIVE substate in order to avoid sending signaling for mobility management and connection management in the absence of an eCall or a designated call. Designated calls may include calls to a non-emergency MSISDN designated by a home network operator for test and terminal reconfiguration services. For example, a designated call may be allowed to a specific number assigned by a home network operator associated with customer service and may be used to request terminal reconfiguration (e.g., convert an eCall-only terminal into a terminal able to receive normal services as well as eCalls), to verify that the terminal is working correctly, etc.

In the eCALL INACTIVE substate, terminal 110 may avoid performing registration, location updating, and IMSI detachment and may also avoid responding to paging requests. Terminal 110 may also reject any requests from CM entities in terminal 110 for MM connections except for eCalls and designated calls. Terminal 110 may periodically search for wireless networks while in the eCALL INACTIVE substate. Only eCalls and designated calls may be available to terminal 110 while in the eCALL INACTIVE substate.

In the eCALL INACTIVE substate, valid subscriber information may be available for terminal 110, an update status may be "DISABLED" (or U4), and a cell that can provide normal service for terminal 110 may be selected. The DISABLED update status may mean that location updating is disabled and that a SIM/USIM does not contain any valid LAI (Location Area Identification), TMSI (Temporary Mobile Subscriber Identity), GSM ciphering key, UMTS integrity key, UMTS ciphering key, or ciphering key sequence number. All of these fields may be set to a "deleted" value upon transitioning to the eCALL INACTIVE substate for compatibility reasons. The presence of other values may not be considered an error by terminal 110. A "location update status" stored on the SIM/USIM may be set to "not updated".

While in the eCALL INACTIVE substate, terminal 110 may maintain awareness of a potential serving cell in a potential serving network but may not initiate MM signaling with the network and may ignore any paging requests. Terminal period, terminal 110 may perform an IMSI detach if required by the serving network and may re-enter the eCALL INACTIVE substate.

Terminal 110 may perform an eCall inactivity procedure when timer Txxxx or timer Tyyyy expires, or is found to have already expired, in any substate within the MM IDLE state except for the NO IMSI, NO CELL AVAILABLE (not shown in FIG. 10), or PLMN SEARCH substate. Terminal 110 may stop other active timers and may perform an IMSI detach procedure if required by the serving network and if the update status is "UPDATED" (or U1). Terminal 110 may then enter the eCALL INACTIVE substate within the MM IDLE state. Table 1 provides details of timers Txxxx and Tyyyy, in accordance with one design.

TABLE 1

| Timer | MM State | Timeout Value | Cause of Start | Normal Stop | At expiry |
| --- | --- | --- | --- | --- | --- |
| Txxxx | All except NULL | 3600 seconds | eCall-only terminal enters MM IDLE state after an emergency call | Time Out Power Off Removal of eCall only restriction | Perform eCall Inactivity procedure |
| Tyyyy | All except NULL | 900 seconds | eCall-only terminal enters MM IDLE state after a test/ reconfiguration call | Time Out Power Off Removal of eCall only restriction | Perform eCall Inactivity procedure |

110 may leave the eCALL INACTIVE substate under one of the conditions described below.

If the SIM/USIM is removed, then terminal 110 may enter a NO IMSI substate.

If coverage is lost, then terminal 110 may enter a PLMN SEARCH substate.

If terminal is de-activated (e.g., powered off) by the user, then terminal 110 may leave the MM IDLE state and enter a NULL state.

If there is a CM request for an eCall, then terminal 110 may attempt an IMSI attach procedure if required by a serving network or may otherwise attempt normal location updating. Once this is complete, terminal 110 may perform other MM and CM procedures to establish the eCall.

If there is a CM request for a designated call (e.g., for testing or terminal reconfiguration), then terminal 110 may attempt the IMSI attach procedure if required by the serving network or may otherwise attempt normal location updating. Once this is complete, terminal 110 may perform other MM and CM procedures to establish the designated call.

Terminal 110 may transition out of the MM IDLE state when an eCall or a designated call is initiated. Terminal 110 may then support normal MM and CM procedures in order to establish the call and to communicate during the call.

Terminal 110 may transition to a NORMAL substate of the MM IDLE state when the eCall or designated call is released. In one design, terminal 110 may continue to support MM and CM procedures for a limited period of time while in the NORMAL substate. This limited time period may be set by the home network operator (e.g., to a fixed or configurable value) and may be stored in the SIM/USIM. Terminal 110 may maintain a timer Txxxx or Tyyyy after an eCall or a designated call is released to keep track of this limited time period. In one design, timer Txxxx may be used for an eCall release, and timer Tyyyy may be used for a designated call release. If the service subscription for terminal 110 does not bar incoming calls, then a PSAP may call back terminal 110 during the limited time period. At the end of the limited time In all cases of leaving the eCALL INACTIVE substate, except to enter the PLMN SEARCH substate or the NULL state, timers Txxxx and Tyyyy may both be reset so that neither timer is considered to have expired and either can be restarted when the terminal next enters the MM IDLE state.

Terminal 110 may transition out of the eCALL INACTIVE substate, for example, if it is de-activated (powered off), if the SIM/USIM is removed, or if terminal 110 is manually re-activated by the user. Manual re-activation may be an optional capability and may be instigated using a special menu function, a button, or a switch on terminal 110.

In one design that is not shown in FIG. 10, terminal 110 may enter the NORMAL substate upon being powered on or manual re-activation and may operate in the NORMAL substate for a predetermined period of time, which may be a fixed or configurable duration. In one design, terminal 110 may perform IMSI attachment, location updating, and possibly other MM and CM procedures (e.g., respond to paging requests) within the predetermined time period. During this predetermined time period, home network 104 may reconfigure the SIM/USIM in terminal 110 to add normal subscription services and remove the eCall-only status. HLR 140 may also bar other services for terminal 110 but may allow incoming calls in order to support PSAP callback. Terminal 110 may suppress incoming calls during the predetermined time period except for cases where there was a preceding eCall.

Terminal 110 may be an eCall-only terminal but may have subscription for other services provided by a network operator. Terminal 110 may be reconfigured during or after an eCall so that it can access the subscribed services. This may be achieved as follows. Terminal 110 may support a normal service invocation option for the user, e.g., via a menu function or a special button on terminal 110. When this is invoked, terminal 110 may instigate location updating. HLR 140 in home network 104 may accept the location updating from terminal 110 and may provide minimum subscription information to VLR 130 in visited network 102. HLR 140 may also reconfigure the SIM/USIM on terminal 110, e.g., via SMS. If the user has subscribed services, then terminal 110 may allow the user to invoke a subscribed service, e.g., an outgoing call or SMS. If the user has no subscribed services, then the location updating may occur, but terminal 110 may not allow the user to invoke any services, or visited network 102 may not allowed any services invoked by the user. Terminal 110 may avoid performing location updating at other times except (i) within a particular duration (e.g., 10 to 60 minutes) following an eCall invocation and (ii) within some other particular duration (e.g., 15 minutes) following invocation of normal service.

The user of terminal 110 may also be able to change network operator/service provider, e.g., to use a different SIM/USIM. The user may also modify the existing subscription used with terminal 110.

Terminal 110 may have normal subscription, and the home network operator may reconfigure the SIM/USIM to eCall-only status. Terminal 110 may then enter the eCALL INACTIVE substate after a predetermined period of time.

FIG. 11 shows a design of a process 1100 performed by a terminal. The terminal may avoid sending signaling for mobility management (MM) and connection management (CM) to wireless networks except for eCalls and designated calls (block 1112). The terminal may periodically search for wireless networks after being powered on without sending signaling to detected networks. The terminal may avoid performing location updating, performing registration, and responding to paging requests.

The terminal may exchange signaling with a wireless network for an eCall or a designated call initiated by the terminal, e.g., automatically initiated by the terminal or manually initiated by a user (block 1114). In one design, the terminal may perform location updating with the wireless network after the eCall or designated call is initiated. The terminal may send a message comprising an indication of a pending eCall or emergency call for location updating, which may expedite location updating. The terminal may also perform call establishment for the eCall or designated call, e.g., as shown in FIG. 2. The terminal may send a message comprising an eCall indicator for call establishment. The eCall indicator may comprise any of the information elements, bits, values, etc. described above.

In one design, the terminal may exchange signaling for mobility management and connection management for a predetermined time period after termination of the eCall or designated call, e.g., for Txxxx seconds after termination of an eCall or Tyyyy seconds after termination of a designated call. The terminal may avoid sending signaling for mobility management and connection management after the predetermined time period. In one design, the terminal may exchange signaling for mobility management and connection management (e.g., for network attachment, location updating, responding to paging requests, reconfiguring of allowed services, etc.) for a limited time period upon being powered on or manual re-activation of the terminal. The terminal may avoid sending signaling for mobility management and connection management after this limited time period.

FIG. 12 shows a design of a process 1200 performed by a wireless network to support eCall establishment. The network may receive no signaling for mobility management and connection management (e.g., for location updating) from a terminal except for eCalls and designated calls (block 1212). The network may exchange signaling with the terminal for an eCall or a designated call initiated by the terminal (block 1214). In one design, the network may perform location updating with the terminal when the eCall or designated call is initiated and may also perform call establishment with the terminal for the eCall or designated call.

Figure 13:
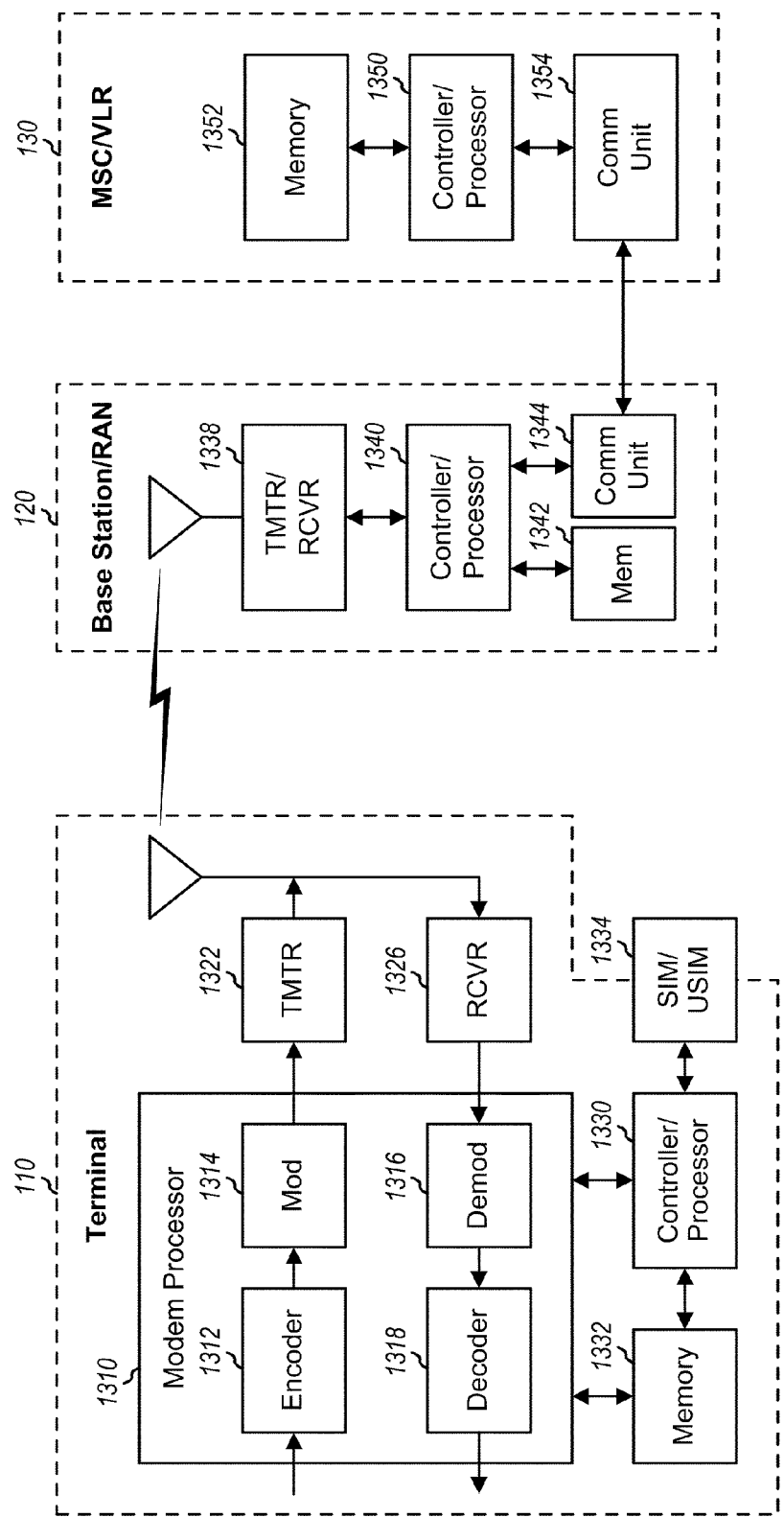
FIG. 13 shows a block diagram of a terminal, a base station, and an MSC.

FIG. 13 shows a block diagram of a design of terminal 110, base station/RAN 120, and MSC/VLR 130 in FIG. 1. At terminal 110, an encoder 1312 may receive data and messages to be sent by terminal 110. The messages may be for registration, location updating, call establishment, etc. Encoder 1312 may process (e.g., encode and interleave) the data and messages and provide coded data and coded signaling. A modulator (Mod) 1314 may further process (e.g., modulate, channelize, and scramble) the coded data and signaling and provide output samples. A transmitter (TMTR) 1322 may condition (e.g., convert to analog, filter, amplify, and frequency upconvert) the output samples and generate an uplink signal, which may be transmitted to one or more base stations in RAN 120. Terminal 110 may also receive downlink signals transmitted by one or more base stations. A receiver (RCVR) 1326 may condition (e.g., filter, amplify, frequency downconvert, and digitize) a received signal and provide input samples. A demodulator (Demod) 1316 may process (e.g., descramble, channelize, and demodulate) the input samples and provide symbol estimates. A decoder 1318 may process (e.g., deinterleave and decode) the symbol estimates and provide decoded data and messages sent to terminal 110. Encoder 1312, modulator 1314, demodulator 1316, and decoder 1318 may be implemented by a modem processor 1310. These units may perform processing in accordance with the radio technology (e.g., GSM, WCDMA, LTE, etc.) used by the wireless network with which terminal 110 is in communication. A controller/processor 1330 may direct the operation of various units at terminal 110. Processor 1330 and/or other modules at terminal 110 may perform or direct process 600 in FIG. 6, process 1100 in FIG. 11, and/or other processes for the techniques described herein. Memory 1332 may store program codes and data for terminal 110. A SIM/USIM 1334 may store subscription information for a service subscription used for terminal 110.

At base station/RAN 120, a transmitter/receiver 1338 may support radio communication with terminal 110 and other terminals. A controller/processor 1340 may perform various functions for communication with the terminals. For the uplink, the uplink signal from terminal 110 may be received and conditioned by receiver 1338 and further processed by controller/processor 1340 to recover the data and messages sent by terminal 110. For the downlink, data and messages may be processed by controller/processor 1340 and conditioned by transmitter 1338 to generate a downlink signal, which may be transmitted to terminal 110 and other terminals. Memory 1342 may store program codes and data for base station/RAN 120. A communication (Comm) unit 1344 may support communication with MSC/VLR 130 and other network entities.

At MSC/VLR 130, a controller/processor 1350 may perform various functions to support communication services for the terminals. Memory 1352 may store program codes and data for MSC/VLR 130. A communication unit 1354 may support communication with base station/RAN 120 and other network entities. Controller/processor 1350 and/or other modules at MSC/VLR 130 may perform or direct all or part of process 700 in FIG. 7, process 1200 in FIG. 12, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Position/location determination techniques may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of performing emergency call (eCall) establishment, comprising:
   generating a message and providing an eCall indicator, the eCall indicator indicating whether the eCall is initiated automatically by the terminal or manually by a user, the message comprising one of the following: a Connection Management (CM) Service Request message, an Emergency SETUP message, or a SETUP message, wherein the Connection Management (CM) Service Request message comprises one of the following:
      a Connection Management (CM) Service Type information element having at least one value used for the eCall indicator; or
      a Mobile Station (MS) Classmark 2 information element having at least one bit used for the eCall indicator;
   the Emergency SETUP message comprises a parameter that is not a Service Category parameter and that contains the eCall indicator; and the SETUP message comprises a called party binary-coded decimal (BCD) number information element that has at least one called party number reserved for the eCall indicator; and
   sending the message to originate an eCall for a terminal.

2. The method of claim 1, further comprising:
providing subscription information comprising an eCall indication from a Home Location Register HLR prior to generating an emergency SETUP message.

3. An apparatus for performing emergency call (eCall) establishment, comprising:
means for generating a message and providing an eCall indicator, the eCall indicator indicating whether the eCall is initiated automatically by the terminal or manually by a user, the message comprising one of the following: a Connection Management (CM) Service Request message, an Emergency SETUP message, or a SETUP message, wherein the Connection Management (CM) Service Request message comprises one of the following:
a Connection Management (CM) Service Type information element having at least one value used for the eCall indicator; or
a Mobile Station (MS) Classmark 2 information element having at least one bit used for the eCall indicator;
the Emergency SETUP message comprises a parameter that is not a Service Category parameter and that contains the eCall indicator; and the SETUP message comprises a called party binary-coded decimal (BCD) number information element that has at least one called party number reserved for the eCall indicator; and
means for sending the message to originate an eCall for a terminal.

4. An apparatus for performing emergency call (eCall) establishment, comprising:
at least one processor configured to generate a message and provide an eCall indicator and to send the message to originate an eCall for a terminal, the processor configured to set the eCall indicator to indicate whether the eCall is initiated automatically by the terminal or manually by a user, the message comprising one of the following: a Connection Management (CM) Service Request message, an Emergency SETUP message, or a SETUP message, wherein the Connection Management (CM) Service Request message comprises one of the following:
a Connection Management (CM) Service Type information element having at least one value used for the eCall indicator; or
a Mobile Station (MS) Classmark 2 information element having at least one bit used for the eCall indicator;
the Emergency SETUP message comprises a parameter that is not a Service Category parameter and that contains the eCall indicator; and the SETUP message comprises a called party binary-coded decimal (BCD) number information element that has at least one called party number reserved for the eCall indicator.

5. A non-transitory computer-readable medium encoded with instructions, when executed by at least one processing unit, perform emergency call (eCall) establishment, the instructions comprising:
code to cause the at least one processing unit to generate a message and provide an eCall indicator; wherein code causes the at least one processing unit to set the eCall indicator to indicate whether the eCall is initiated automatically by the terminal or manually by a user, the message comprising one of the following: a Connection Management (CM) Service Request message, an Emergency SETUP message, or a SETUP message, wherein the Connection Management (CM) Service Request message comprises one of the following:
a Connection Management (CM) Service Type information element having at least one value used for the eCall indicator; or
a Mobile Station (MS) Classmark 2 information element having at least one bit used for the eCall indicator;
the Emergency SETUP message comprises a parameter that is not a Service Category parameter and that contains the eCall indicator; and the SETUP message comprises a called party binary-coded decimal (BCD) number information element that has at least one called party number reserved for the eCall indicator; and
code to cause the at least one processing unit to send the message to originate an eCall for a terminal.

6. A method of supporting emergency call (eCall) establishment, comprising:
receiving a message to originate an eCall from a terminal; and
obtaining an eCall indicator from the message; the eCall indicator indicating whether the eCall is initiated automatically by the terminal or manually by a user, the message comprising one of the following: a Connection Management (CM) Service Request message, an Emergency SETUP message, or a SETUP message, wherein the Connection Management (CM) Service Request message comprises one of the following:
a Connection Management (CM) Service Type information element having at least one value used for the eCall indicator; or
a Mobile Station (MS) Classmark 2 information element having at least one bit used for the eCall indicator;
the Emergency SETUP message comprises a parameter that is not a Service Category parameter and that contains the eCall indicator; and the SETUP message comprises a called party binary-coded decimal (BCD) BCD number information element that has at least one called party number reserved for the eCall indicator.

7. The method of claim 6, further comprising:
receiving subscription information comprising an eCall indication from a Home Location Register HLR; and
determining that the terminal is an eCall-only terminal.

8. An apparatus for supporting emergency call (eCall) establishment, comprising:
means for receiving a message to originate an eCall from a terminal; and
means for obtaining an eCall indicator from the message; the eCall indicator indicating whether the eCall is initiated automatically by the terminal or manually by a user, the message comprising one of the following: a Connection Management (CM) Service Request message, an Emergency SETUP message, or a SETUP message, wherein the Connection Management (CM) Service Request message comprises one of the following:
a Connection Management (CM) Service Type information element having at least one value used for the eCall indicator; or
a Mobile Station (MS) Classmark 2 information element having at least one bit used for the eCall indicator;
the Emergency SETUP message comprises a parameter that is not a Service Category parameter and that contains the eCall indicator; and the SETUP message comprises a called party binary-coded decimal (BCD) number information element that has at least one called party number reserved for the eCall indicator.

9. The apparatus of claim 8, further comprising:
means for receiving subscription information comprising an eCall indication from a Home Location Register HLR; and
means for determining that the terminal is an eCall-only terminal.

* * * * *